US010845341B2

United States Patent
Urata et al.

(10) Patent No.: US 10,845,341 B2
(45) Date of Patent: Nov. 24, 2020

(54) ULTRASONIC FLAW-DETECTION METHOD AND APPARATUS FOR BLADE GROOVE IN TURBINE ROTOR DISC

(71) Applicant: MITSUBISHI HEAVY INDUSTRIES COMPRESSOR CORPORATION, Hiroshima (JP)

(72) Inventors: Mikiyasu Urata, Tokyo (JP); Seiichi Kawanami, Tokyo (JP); Kiyotaka Aoki, Tokyo (JP); Yoshikazu Yamada, Tokyo (JP); Daisuke Takemura, Tokyo (JP); Atsushi Nakajima, Tokyo (JP)

(73) Assignee: MITSUBISHI HEAVY INDUSTRIES COMPRESSOR CORPORATION, Hiroshima (JP)

( * ) Notice: Subject to any disclaimer, the term of this patent is extended or adjusted under 35 U.S.C. 154(b) by 110 days.

(21) Appl. No.: 15/502,693

(22) PCT Filed: Jul. 28, 2015

(86) PCT No.: PCT/JP2015/071383
§ 371 (c)(1),
(2) Date: Feb. 8, 2017

(87) PCT Pub. No.: WO2016/024475
PCT Pub. Date: Feb. 18, 2016

(65) Prior Publication Data
US 2017/0254785 A1      Sep. 7, 2017

(30) Foreign Application Priority Data

Aug. 12, 2014 (JP) ................................ 2014-164455

(51) Int. Cl.
*G01N 29/26* (2006.01)
*G10K 11/35* (2006.01)
(Continued)

(52) U.S. Cl.
CPC ......... *G01N 29/262* (2013.01); *G01N 29/043* (2013.01); *G01N 29/225* (2013.01);
(Continued)

(58) Field of Classification Search
CPC ......... G01N 2291/2693; G01N 29/043; G01N 29/26; G01N 29/262; G01N 29/265;
(Continued)

(56) References Cited

U.S. PATENT DOCUMENTS 1,719,415 A * 7/1929 Goldie Back ......... F01D 5/3007
                                                          416/216
3,986,793 A * 10/1976 Warner ................... B23P 6/002
                                                          416/212 A
(Continued)

FOREIGN PATENT DOCUMENTS

GB    2480633 B   * 12/2013   ........... G01N 29/043
JP    62-112060 A    5/1987
(Continued)

OTHER PUBLICATIONS

Machine translation JP2004340809A.*
(Continued)

*Primary Examiner* — David L Singer
(74) *Attorney, Agent, or Firm* — Birch, Stewart, Kolasch & Birch, LLP

(57) ABSTRACT

A method includes: an arrangement step of arranging a phased array probe including a plurality of oscillators each of which is capable of emitting ultrasonic waves on an end surface of the rotor disc, in a parallel state in which the plurality of oscillators are arranged along a circumferential direction of the rotor disc; a first transmission step of emitting ultrasonic waves from the plurality of oscillators in the parallel state, while a timing of emitting the ultrasonic waves from each of the oscillators is controlled in a first (Continued)

emission pattern, and receiving reflection waves of the ultrasonic waves; and a second transmission step of emitting ultrasonic waves from the plurality of oscillators in the parallel state, while the timing of emitting the ultrasonic waves from each of the oscillators is controlled in a second emission pattern different from the first emission pattern, and receiving reflection waves of the ultrasonic waves.

5 Claims, 8 Drawing Sheets

(51) Int. Cl.
    *G01N 29/04*    (2006.01)
    *G01N 29/22*    (2006.01)
    *G01N 29/275*   (2006.01)
    *G10K 11/00*    (2006.01)
    *G10K 11/34*    (2006.01)
    *F01D 5/30*    (2006.01)

(52) U.S. Cl.
    CPC ........... *G01N 29/26* (2013.01); *G01N 29/275* (2013.01); *G10K 11/004* (2013.01); *G10K 11/346* (2013.01); *G10K 11/355* (2013.01); *F01D 5/3007* (2013.01); *G01N 2291/015* (2013.01); *G01N 2291/0234* (2013.01); *G01N 2291/044* (2013.01); *G01N 2291/106* (2013.01); *G01N 2291/2693* (2013.01)

(58) Field of Classification Search
    CPC ............. G01N 29/07; G01N 2291/106; G01N 2291/0289; G01N 2291/044; G01N 2291/015; G01N 2291/0234; G10K 11/346; G10K 11/355; G10K 11/004
    USPC ........................... 73/633, 628, 625–626, 660
    See application file for complete search history.

(56) References Cited

U.S. PATENT DOCUMENTS

| | | | | |
|---|---|---|---|---|
| 4,502,331 A * | 3/1985 | Singh | ............. | G01N 29/07 73/627 |
| 4,767,275 A * | 8/1988 | Brown | ............. | F01D 5/326 416/193 A |
| 6,792,809 B1 * | 9/2004 | Moore | ............. | F01D 25/285 73/583 |
| 7,428,842 B2 | 9/2008 | Fair et al. | | |
| 8,525,831 B2 | 9/2013 | Zhang et al. | | |
| 2005/0126291 A1 * | 6/2005 | Czerw | ............. | G01N 29/28 73/589 |
| 2006/0283250 A1 * | 12/2006 | Fair | ............. | G01N 29/262 73/593 |
| 2007/0089517 A1 | 4/2007 | Bentzel | | |
| 2008/0245151 A1 * | 10/2008 | Roney | ............. | F01D 25/285 73/628 |
| 2009/0120192 A1 * | 5/2009 | Suzuki | ............. | G01N 29/07 73/623 |
| 2012/0060609 A1 * | 3/2012 | Fukutomi | ............. | G01N 29/225 73/592 |

FOREIGN PATENT DOCUMENTS

| | | | | |
|---|---|---|---|---|
| JP | 62112060 | A | * | 5/1987 |
| JP | 1-299456 | A | | 12/1989 |
| JP | 01299456 | A | * | 12/1989 |
| JP | 4-194745 | A | | 7/1992 |
| JP | 04194745 | A | * | 7/1992 ............. G01N 29/07 |
| JP | 5-244691 | A | | 9/1993 |
| JP | 6-19341 | B2 | | 3/1994 |
| JP | 09189689 | A | * | 7/1997 |
| JP | 2002310998 | A | * | 10/2002 ............. G01N 29/11 |
| JP | 2004-340809 | A | | 12/2004 |
| JP | 2004340809 | A | * | 12/2004 |
| JP | 2006194591 | A | * | 7/2006 |
| JP | 2007-116894 | A | | 5/2007 |
| JP | 2007-151561 | A | | 6/2007 |
| JP | 2007-278854 | A | | 10/2007 |
| JP | 2007-309771 | A | | 11/2007 |
| JP | 2007-322350 | A | | 12/2007 |
| JP | 2009-204368 | A | | 9/2009 |
| JP | 2009-244079 | A | | 10/2009 |
| JP | 2010-117215 | A | | 5/2010 |
| JP | 2010117215 | A | * | 5/2010 |
| JP | 2010-185367 | A | | 8/2010 |
| JP | 2011-27423 | A | | 2/2011 |
| JP | 2011027423 | A | * | 2/2011 |
| JP | 2011-208978 | A | | 10/2011 |
| JP | 2012-253583 | A | | 12/2012 |
| JP | 2013-57681 | A | | 3/2013 |
| JP | 2013061286 | A | * | 4/2013 |
| WO | WO 2009/000793 | A1 | | 12/2008 |

OTHER PUBLICATIONS

Machine translation JP2011027423.*
Machine translation JPH04194745/ 2966515.*
Machine translation JPS62112060.*
Opheys et al, Blade Root / Blade Attachment Inspection by Advanced UT and Phased Array Technique, 6th international Charles Parsons Turbine Conference, 16 ☐ Sep. 18, 2003, Trinity College, Dublin.*
Naumann, Steam Turbine Blade Design Options: How to Specify or Upgrade, 1982, Proceedings of the Eleventh Turbomachinery Symposium.*
Dumas et al, Nondestructive Inspection of Blade Roots and Blade Attachment Grooves—Ideal Application of Phased Array Inspection Technique, ECNDT 2006—Mo.2.8.2.*
Charlesworth, Phased array ultrasonic inspection of low pressure steam turbine rotors, Curved Axial Entry Fir tree roots, NDT 2010 Conference Topics.*
Olympus, Phased Array Tutorial: Phased Array Transducer Characteristics, Dec. 31, 2008.*
Charlesworth, THESIS: Ultrasonic phased array testing in the power generation industry Novel wedge development for the inspection of steam turbine blades roots, Nov. 2011.*
Merriam-Webster Dictionary, definition axial (Year: 2014).*
Merriam-Webster Dictionary, definition axis (Year: 2014).*
Rauschenbach et al, Advanced NDE inspection methods for detection of SCC in blade attachments and blade roots, 17th World Conference on Nondestructive Testing, Oct. 25-28, 2008, Shanghai, China (Year: 2008).*
Abbasi et al, Ultrasonic Phased Array Inspection of Turbine Components (Year: 2006).*
Ciorau et al, 3-D Data Plotting: A Useful Tool for PAUT, NDT. net—The e-Journal of Nondestructive Testing (Jul. 2008) (Year: 2008).*
Ciorau et al, Developments in Ultrasonic Phased Array Inspection III New PAUT Applications for Turbine Components Developed by OPG-IMCS within 2006-2010 Period (Year: 2010).*
Poguet et al, Special linear phased array probes used for ultrasonic examination of complex turbine components, 8th European Congress on Non Destructive testing Jun. 17-21, 2002—Barcelona—Spain (Year: 2002).*
Ciorau et al, In-situ examination of ABB L-0 blade roots and rotor steeple of low-pressure steam turbine, using phased array technology. Proof-of-principle results, NDT.net—Jul. 2000, vol. 5 No. 07 (Year: 2000).*
Dr. Justin Zachary, The long and short of last stage blades, Power Magazine, (Year: 2006).*
International Search Report for PCT/JP2015/071383 (PCT/ISA/ 210) dated Oct. 20, 2015.
International Preliminary Report on Patentability and Written Opinion of the International Searching Authority (Forms PCT/IB/338, PCT/IB/373, PCT/ISA/237 and PCT/IB/326) dated Feb. 23, 2017, for International Application No. PCT/JP2015/071383, with an English translation.

(56) References Cited

OTHER PUBLICATIONS

"Radical Principle of Phased Array", Yuichiro Yamamoro, pp. 29-32 of No. 4, vol. 74, Apr. 20, 2015.
The Office Action dated Jun. 8, 2018, issued to the corresponding JP Application No. 2014-164455 with an English Translation.
Extended European Search Report dated Jan. 19, 2018 issued to the corresponding EP Application No. 15831648.9.
Office Action dated Nov. 23, 2018 issued in the corresponding Chinese Aplication No. 201580034325.4.

* cited by examiner

ARROW B VIEW

ARROW C VIEW

ULTRASONIC FLAW-DETECTION METHOD AND APPARATUS FOR BLADE GROOVE IN TURBINE ROTOR DISC

TECHNICAL FIELD

The present disclosure relates to a method for checking defects of a blade groove portion of a turbine rotor disc by using the phased array method, a kind of ultrasonic flaw-detection, and to an apparatus used in the method.

BACKGROUND ART

In a gas turbine and a steam turbine, turbine blades are fixed to a rotor disc of a turbine rotor while blade root portions of the turbine blades (hereinafter, also referred to as merely "blade root portions") are inserted into groove portions formed on an outer peripheral surface of the rotor disc for fixing the turbine blades (hereinafter, also referred to as merely "blade groove portions").

To check presence and size of defects such as cracks formed in a blade groove portion of a turbine rotor, testing methods such as the magnetic-particle flaw detection and the replica method can be used. However, these methods require removing the blade root portions of turbine blades out from the blade groove portions, thus taking a considerable amount of time and costs for associated works before and after the test itself, including removal of the turbine blades and reattachment of the turbine blades after testing.

Thus, it is desirable to develop a non-destructive testing technique whereby blade groove portions can be checked without removing turbine blades from the blade groove portions. For instance, Patent Documents 1 and 2 disclose ultrasonic flaw-detection methods whereby it is possible to check presence of defects in a blade groove portion by emitting ultrasonic waves to the blade groove portion, receiving reflection waves thereof, and analyzing the waveforms of the reflection waves, for instance.

Patent Document 1 employs the phased array method as such an ultrasonic flaw-detection method, whereby a phased array probe having a plurality of oscillators is used. The oscillators are arranged along the front-rear direction of the phased array probe, each oscillator being capable of controlling the timing to emit ultrasonic waves independently. While ultrasonic waves emitted from the oscillators form a composite wave front, it is possible to control the radiation direction and the focal range of the composite wave front flexibly by controlling the emission timings of the respective oscillators.

During testing, the phased array probe is moved (scanned) in the front-rear direction along the surface of an object to be tested, whereby it is possible to change the range of testing. Ultrasonic waves are emitted in the forward and diagonally-downward direction from the phased array probe. The inclination angle of ultrasonic waves with respect to the front-rear direction of the phased array probe can be electrically manipulated by controlling the emitting timings of the oscillators, which also makes it possible to change the range of testing.

CITATION LIST

Patent Literature

Patent Document 1: JP2009-244079A
Patent Document 2: JP2013-057681A

SUMMARY

Problems to be Solved

When a blade groove portion is tested by the phased array method, a phased array probe is normally placed on an end surface of a rotor disc. The phased array probe is then moved in the radial direction of the end surface of the rotor disc, while ultrasonic waves are emitted repeatedly toward the blade groove portion, and reflection waves from the blade groove portion are received. In this case, a plurality of oscillators are arranged along the radial direction of the end surface of the rotor disc, which is the moving direction of the phased array probe, and the emitting timings of the oscillators are controlled, which makes it possible to change the depth of the range of testing.

Meanwhile, in a blade groove portion of a turbine rotor, defects such as cracks develop in various directions. Defects such as cracks evolve in different directions particularly in blade groove portions 108 of a curved side entry type, in which the blade groove portions 108 deviate from the axial direction of the rotor disc 106 and are bended in an arc shape as depicted in FIG. 10, as compared to in those of a normal side entry type in which blade root portions extend linearly along the axial direction of the rotor disc.

If defects are formed in directions different from the direction of emission of ultrasonic waves, directions of reflection waves also become different when an ultrasonic flaw-detection method is performed. For instance, with reference to FIG. 11, a phased array probe 100 can receive a reflection wave "e" reliably if the direction of emission of an ultrasonic wave "u" from the phased array probe 100 is at right angle with respect to the direction in which a crack "c" is formed. In contrast, even if the position of a defect is the same, a direction of emission of ultrasonic waves being not at right angle with respect to the direction of generation of a crack may lead to a decrease in a reflection rate of reflection waves in a receiving direction, and detection of the reflection waves may fail. As result, the accuracy in detecting defects deteriorates.

Such deterioration of detection accuracy can be prevented by changing the direction of the phased array probe in the circumferential direction of the rotor disc to change the relative relationship between the radiation direction of ultrasonic waves and the occurrence direction of a defect.

As depicted in FIG. 11, when a blade groove portion 108 is tested by a typical phased array method, a phased array probe 100 is placed at an end surface 106a of a rotor disc 106. In this arrangement, a plurality of oscillators 110 are arranged along the radial direction "a" of the rotor disc 106. The phased array probe 100 is moved in the radial direction "a" of the rotor disc 106, while ultrasonic waves "u" are emitted toward the blade groove portion 108 from the phased array probe 100, and reflection waves from the blade groove portion 108 are received.

In this typical method, to change the direction of the phased array probe 100 in the circumferential direction "b" of the rotor-disc end surface 106a, the phased array probe 100 needs to scan also in the circumferential direction in addition to the radial direction "a", which makes the scanning more difficult.

In view of the above issues, an object of at least one embodiment of the present invention is to provide a method and an apparatus for performing ultrasonic flaw-detection on a blade groove portion of a turbine rotor disc, whereby it is possible to detect defects such as cracks at high accuracy.

Solution to the Problems (1) A method of performing ultrasonic flaw-detection according to at least one embodiment of the present invention for a blade groove portion of a turbine rotor disc comprises: an arrangement step of arranging a phased array probe including a plurality of oscillators each of which is capable of emitting ultrasonic waves on an end surface of the rotor disc, in a parallel state in which the plurality of oscillators are arranged along a circumferential direction of the rotor disc; a first transmission step of emitting ultrasonic waves from the plurality of oscillators in the parallel state, while a timing of emitting the ultrasonic waves from each of the oscillators is controlled in a first emission pattern, and receiving reflection waves of the ultrasonic waves; and a second transmission step of emitting ultrasonic waves from the plurality of oscillators in the parallel state, while the timing of emitting the ultrasonic waves from each of the oscillators is controlled in a second emission pattern different from the first emission pattern, and receiving reflection waves of the ultrasonic waves.

The present inventors found that, if a phased array probe 100 has a plurality of oscillators 110 arranged along the radial direction (direction of arrow "a") of a rotor-disc end surface 106a, the phased array probe 100 receives a smaller ratio of reflection waves "e" depending on the radiation direction of ultrasonic waves, which makes it difficult to detect defects at high accuracy, as shown in FIG. 11. It was also found that the above phenomenon is remarkably observed when a blade groove portion of a curved side entry type is tested. This is because, according to the findings of the present inventors, blade groove portions of a curved side entry type are curved and deviated from the axial direction of the rotor disc, so that defects such as cracks are formed in different directions.

On the basis of these findings, the present inventors arrived at a technical idea to change the radiation direction of ultrasonic waves in the circumferential direction of a rotor disc, in order to improve the accuracy in detecting defects. However, the radiation direction of ultrasonic waves cannot be scanned in the circumferential direction of a rotor disc simply by the typical technique of providing a plurality of oscillators aligned in the radial direction of the end surface of the rotor disc and controlling the emitting pattern of the oscillators.

In this regard, with the above configuration (1), the plurality of oscillators are arranged along the circumferential direction of the rotor-disc end surface, and ultrasonic waves are emitted in the first emitting pattern and the second emitting pattern, whereby it is possible to easily change the radiation direction of ultrasonic waves in the circumferential direction of the rotor-disc end surface without changing the direction of the phased array probe.

Changing the radiation direction of ultrasonic waves in the circumferential direction of the rotor-disc end surface makes it possible to detect defects such as cracks in the second emitting pattern even if the defects cannot be detected in the first emitting pattern, and vice versa.

It should be noted that, an expression "along the direction X" in the present specification refers not only to when a feature is strictly along the direction X, but also to when a feature is along a direction more or less off from the direction X.

(2) In some embodiments, in the above configuration (1), each of the plurality of oscillators has an emitting surface capable of emitting the ultrasonic waves. The emitting surface has a concave shape extending longer in a direction that intersects with an arrangement direction of the oscillators than in the arrangement direction, and being recessed at center in a direction that intersects with the arrangement direction so that the ultrasonic waves emitted from the emitting surface converge at one focal point.

With the above configuration (2), ultrasonic waves emitted from the emitting surfaces converge at one focal point, which makes it possible to increase the accuracy in detecting defects in the vicinity of the focal point.

(3) In some embodiments, in the above configuration (1) or (2), the method further comprises a radial-direction moving step of moving the probe along a radial direction of the rotor disc. The first transmission step and the second transmission step are performed before and after the radial-direction moving step.

With the above configuration (3), before and after the radial-direction moving step, the first transmission step and the second transmission step are performed, which makes it possible to detect defects easily at high accuracy over a wide range without changing the direction of the phased array probe.

(4) In some embodiments, in any one of the above configurations (1) to (3), the method further comprises an adjustment step of adjusting a number of the plurality of oscillators included in the phased array probe in accordance with a size or a shape of the blade groove portion.

With the above configuration (4), the phased array probe can be reduced in size by adjusting the number of the oscillators in accordance with the size and shape of the rotor disc and the blade groove portion. Thus, even if a turbine rotor has small gaps between rotor discs and between blade groove portions, it is possible to check the turbine rotor easily at high accuracy.

(5) In some embodiments, in any one of the above configurations (1) to (4), each of the plurality of oscillators is capable of receiving the reflection waves of the ultrasonic waves.

With the above configuration (5), since the oscillators have both functions of emitting and receiving ultrasonic waves, it is possible to detect defects easily at high accuracy with a simple configuration.

(6) In some embodiments, in any one of the above configurations (1) to (4), the method further comprises a plurality of receiving oscillators for receiving the reflection waves of the ultrasonic waves.

With the above configuration (6), since oscillators for emitting ultrasonic waves and receiving ultrasonic waves are separately provided, it is possible to suppress interference between ultrasonic waves emitted by the oscillator (incident waves) and reflection waves, in the vicinity of the rotor-disc end surface. As a result, it is possible to detect defects easily at high accuracy even in a region closer to the surface of the end surface of the rotor disc.

(7) In some embodiments, in any one of the above configurations (1) to (6), the blade groove portion for fixing the turbine blade disposed on the rotor disc of the turbine extends in an arc shape so as to deviate from an axial direction of the rotor disc.

With the above configuration (7), it is possible to detect defects accurately and easily by changing the radiation direction of ultrasonic waves even if the blade groove portion extends in arc shape and defects are formed in different directions.

(8) An ultrasonic flaw-detection apparatus for a blade groove portion of a turbine rotor disc, according to at least one embodiment of the present invention, is to be used in the method of performing ultrasonic flaw-detection for a blade groove portion of a turbine rotor disc according to any one of the above (1) to (7). The ultrasonic flaw-detection apparatus comprises: the phased array probe including the plurality of oscillators; and a probe support device configured to support the phased array probe in a state in which the plurality of oscillators are arranged in a radial direction of the rotor disc, and to support the phased array probe movably along a circumferential direction of the rotor disc.

With the above configuration (8), since the probe support device is provided, it is possible to move the phased array probe easily along the radial direction of the rotor disc. Thus, it is possible to detect defects accurately and easily over a wide range for one blade groove portion.

(9) In some embodiments, in the above configuration (8), the ultrasonic flaw-detection apparatus further comprises a rotor-disc support device which rotatably supports the rotor disc. The probe support device comprises: a trolley capable of traveling in a direction; a support pole mounted to the trolley and being capable of extending and contracting; and an arm capable of extending and contracting, supported rotatably by the support pole so as to be rotatable within a vertical plane including the direction of traveling. The phased array probe is supported by the trolley via the arm and the support pole.

With the above configuration (9), it is possible to easily place the phased array probe on a position on the rotor-disc end surface by rotating the rotor disc, moving the trolley, extending and contracting the support pole, extending and contracting the arm, and rotating the arm. Thus, it is possible to detect defects accurately and easily over a wide range for more than one blade groove portion.

(10) In some embodiments, in the above configuration (9), the ultrasonic flaw-detection apparatus further comprises: a frame disposed between the phased array probe and a tip of the arm, and configured to support the phased array probe rotatably; and an elastic member disposed between the frame and the phased array probe, for pressing the phased array probe against an end surface of the rotor disc.

With the above configuration (10), the elastic member presses the phased array probe toward the end surface of the rotor disc, and thereby it is possible to have the phased array probe constantly in close contact with the end surface, and to perform tests easily and stably at high accuracy.

Advantageous Effects

According to at least one embodiment of the present invention, it is possible to provide a method and an apparatus for performing ultrasonic flaw-detection on a blade groove portion of a turbine rotor disc, whereby it is possible to detect defects such as cracks at high accuracy.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

An embodiment of the present invention will now be described with reference to FIGS. 1 to 3.

Figure 1:
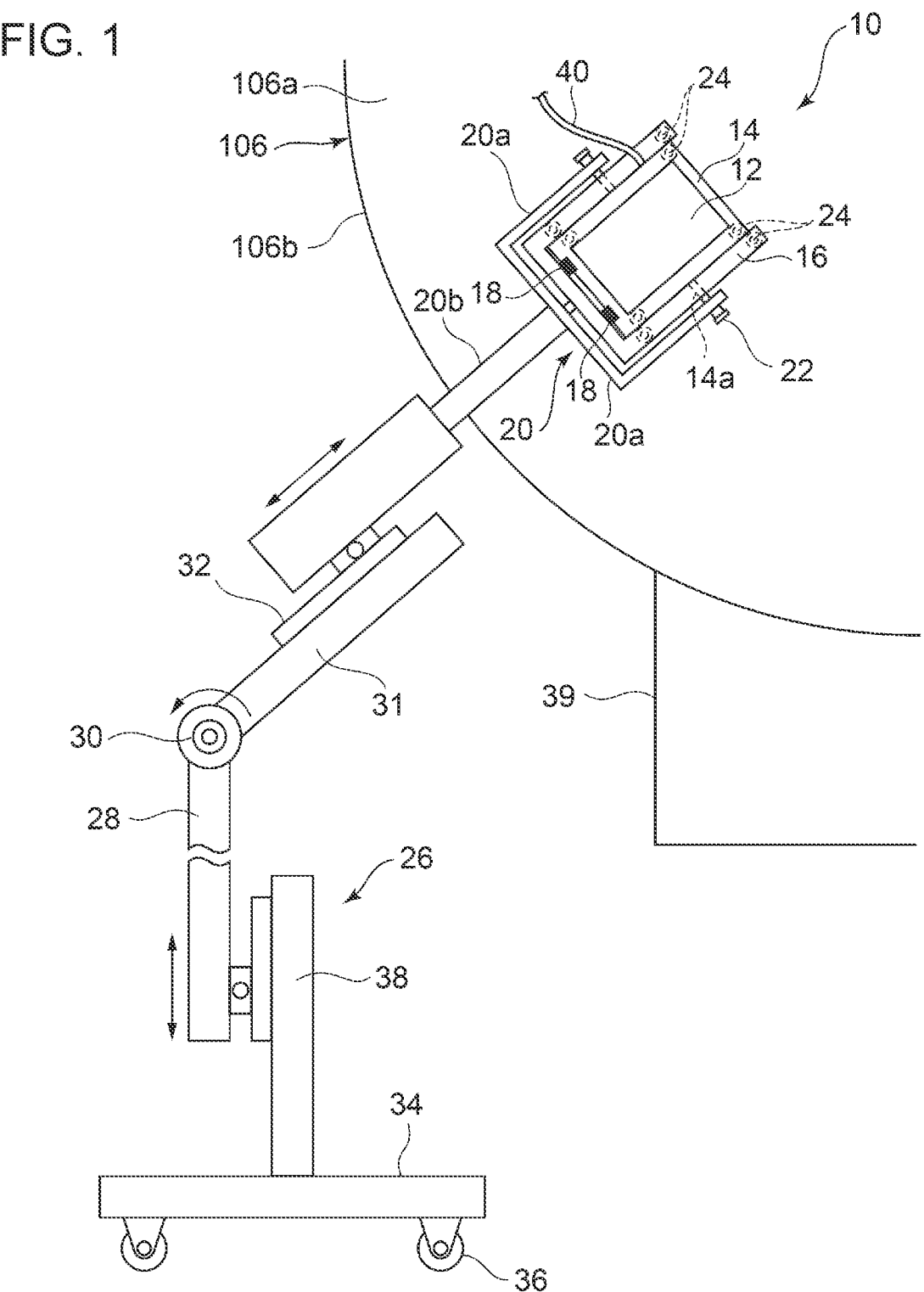
FIG. 1 is a front view schematically showing an ultrasonic flaw-detection apparatus according to an embodiment of the present invention, as well as a part of a rotor disc.

FIG. 1 illustrates a configuration of an ultrasonic flaw-detection apparatus 10 according to the present embodiment. A phased array probe 12 has a cuboid outer shape and is housed in a space formed inside a frame 14 having a quadrate shape, and in this state, fixed to the frame 14 with a fixing unit such as a bolt.

The frame 14 has a rotational shaft 14a formed integrally. The frame 14 is inserted into a support frame 16 having a quadrate shape which is open at one side, and the rotational shaft 14a is fitted rotatably into a hole formed on the support frame 16. In this way, the frame 14 is supported rotatably onto the support frame 16 about the rotational shaft 14a.

Two springs 18 are disposed on the bottom side of the support frame 16 facing the frame 14. The springs 18 apply spring forces that rotate the frame 14 in a direction about the rotational shaft 14a, which is a direction to bring the phased array probe 12 into close contact with the rotor-disc end surface 106a, when the phased array probe 12 is placed on the rotor-disc end surface 106a.

In FIG. 1, turbine blades and blade groove portions mounted to the outer peripheral surface 106b of the rotor disc 106 are not depicted.

The support frame 20 includes a support frame body 20a having a quadrate shape with one side open, and a main shaft 20b coupled to the support frame body 20a. The support frame 16 is fixed to the support frame body 20a with bolts 22.

The frame 14 and the support frame 16 include four balls 24 on respective four corners on one face (the face facing the rotor-disc end surface 106a). The balls 24 are mounted rotatably to the frame 14 or to the support frame 16. The balls 24 enable the frame 14 and the support frame 16 to easily slide while being in contact with the end surface 106a of the rotor disc 106.

A probe support device 26 includes a trolley 34 having four casters 36 and being capable of running in a traveling direction, a support pole 38 mounted and fixed to the trolley 34, and an arm 31 supported rotatably by the support pole 38 within a vertical plane including the traveling direction. The support pole 38 has a height adjustment part 28 which is supported slidably in the height direction with respect to the support pole 38.

The arm 31 is supported rotatably within a plane via a shaft 30 with respect to the height adjustment part 28. The arm 31 has a scanning-position adjustment part 32 which supports the main shaft 20b of the support frame 20 slidably in the axial direction of the main shaft 20b within the plane.

The ultrasonic flaw-detection apparatus 10 is configured such that the phased array probe 12 can be positioned in a position on the rotor-disc end surface 106a when placed so that the plane is parallel to the rotor-disc end surface 106a.

A face of the phased array probe 12 that emits ultrasonic waves is fixed to the frame 14 so as to be substantially flush with the frame 14 and the support frame 16. A cable 40 is connected to the phased array probe 12. Control signals are inputted into the phased array probe 12 and detection signals are outputted from the phased array probe 12, via the cable 40.

Figure 10:
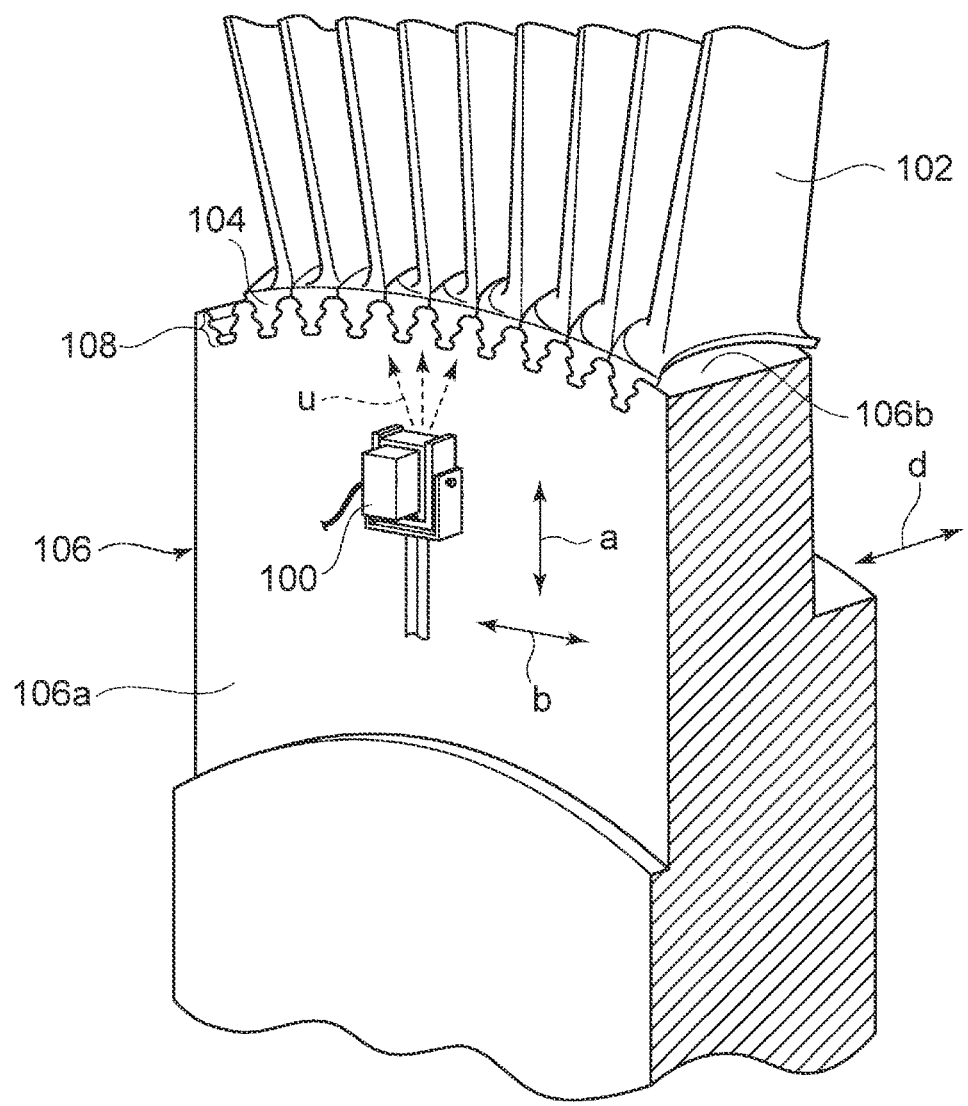
FIG. 10 is a perspective view of blade groove portions of a curved side entry type.
Figure 11:
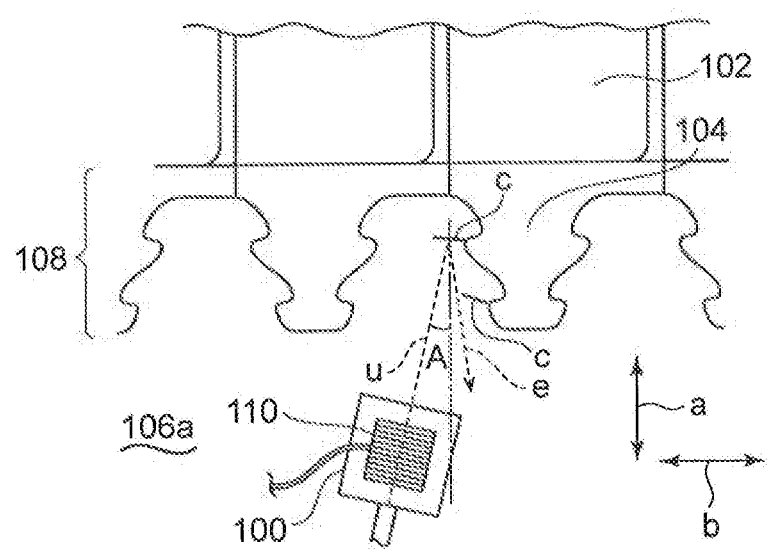
FIG. 11 is an explanatory diagram showing a testing method according to a typical phased array method.

A detection target of the ultrasonic flaw-detection apparatus 10 is the blade groove portion 108 of a curved side entry type depicted in FIG. 10, for instance. The ultrasonic flaw-detection apparatus 10 is moved to the rotor disc 106, and the phased array probe 12 is disposed on the rotor-disc end surface 106a. In this case, with the shaft 30 being disposed orthogonal to the rotor-disc end surface 106a, the arm 31 can be rotated within a plane parallel to the rotor-disc end surface 106a, and the scanning-position adjustment part 32 can move the phased array probe 12 in the radial direction of the rotor disc 106.

A radial-direction moving step is performed, in which the rotor disc 106 is supported rotatably with a rotor-disc support device 39, and the phased array probe 12 is moved along the radial direction of the rotor disc 106.

During this time, the phased array probe 12 emits ultrasonic waves toward the blade groove portion 108 while being disposed on the rotor-disc end surface 106a, and receives reflection waves reflected by the blade groove portion 108. Waveforms of the reflection waves are analyzed to check presence and size of defects such as cracks.

Next, a turbine rotor is rotated manually or by a driving motor, and the radial-direction moving step is performed again. Performing the radial-direction moving step repeatedly makes it possible to radiate ultrasonic waves to all the blade groove portions 108 mounted to the entire periphery of the rotor-disc outer peripheral surface 106b, thereby checking all the blade groove portions 108.

Figure 2:
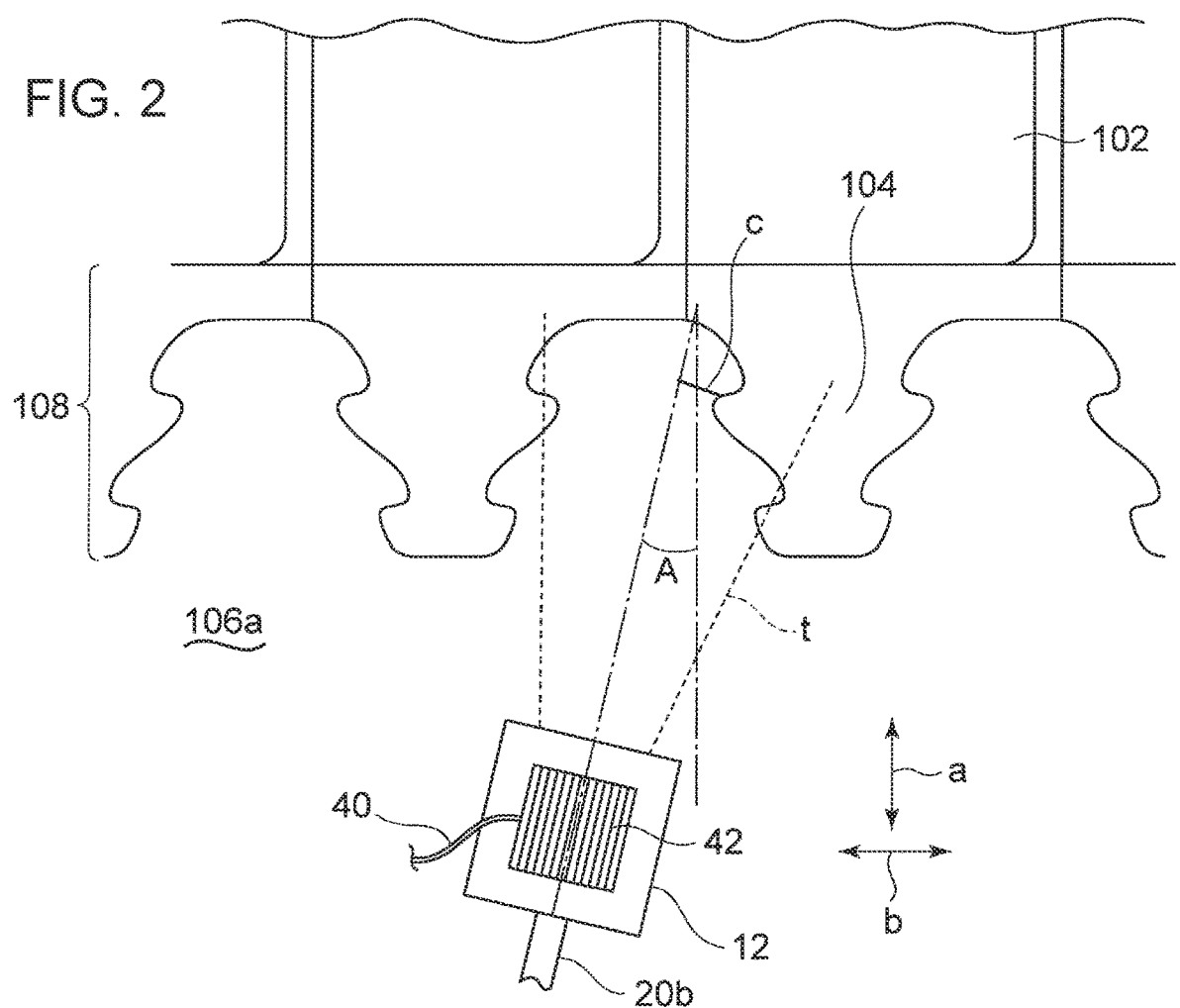
FIG. 2 is an explanatory diagram showing a flaw-detection method according to the above embodiment.

FIG. 2 is a diagram showing an emission range of ultrasonic waves emitted by the ultrasonic flaw-detection apparatus 10. FIG. 3 is an enlarged view of the phased array probe 12.

Figure 3:
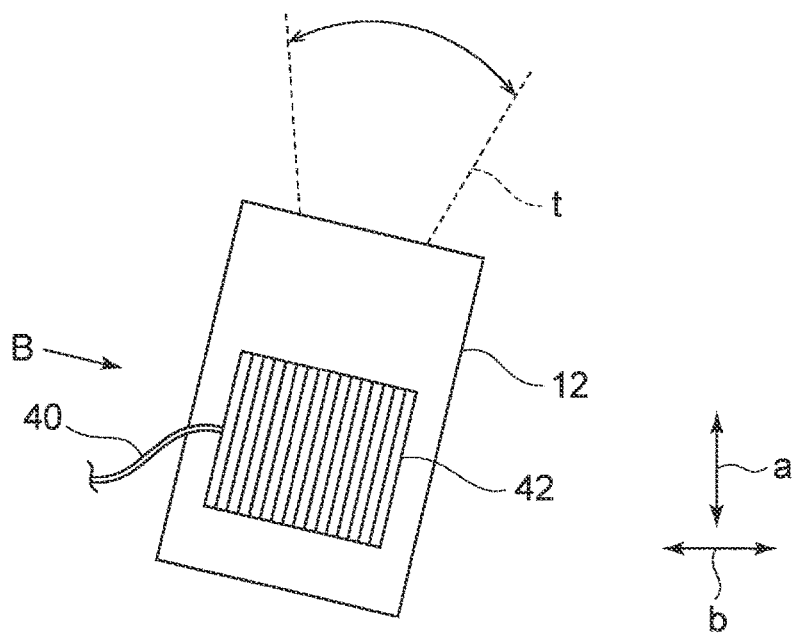
FIG. 3 is a schematic diagram showing a phased array probe of the ultrasonic flaw-detection apparatus.

As depicted in FIG. 3, the phased array probe 12 includes a plurality of oscillators 42. The oscillators 42 have a rod shape with a quadrate cross section, and arranged in the circumferential direction (direction of arrow "b") of the rotor disc 106. The cable 40 transmits electric pulses to the oscillators 42 to excite the oscillators 42. When the ultrasonic waves emitted by the oscillators 42 are reflected by the blade groove portion 108, and the reflection waves are received by the oscillators 42, the cable 40 transmits the received reflection waves to a processing part (not depicted).

As depicted in FIG. 2, the phased array probe 12 emits ultrasonic waves to the blade groove portion 108 at a skew angle A. As depicted in FIG. 2, the skew angle A is defined as an angle formed by the radiation direction of ultrasonic waves or the front-rear direction of the phased array probe 100 with the radial direction "a" of the rotor disc 106.

FIGS. 9A to 9D schematically describe various scanning methods using the phased array method. The phased array probe 12 includes a plurality of oscillators 42 arranged in parallel, and the timing to apply a pulse voltage to each oscillator 42 is controlled, whereby the exciting time is controlled for each oscillator 42, and the timing to emit ultrasonic waves (emitting pattern) can be controlled. Accordingly, it is possible to flexibly change the radiation direction of a composite wave front "s" (an envelope surface of each ultrasonic wave "u") formed by combination of wave fronts of ultrasonic waves "u" emitted from the respective oscillators 42, and the focal range where the composite front "s" has a line focus f1 or a focal point f2.

Figure 9A:
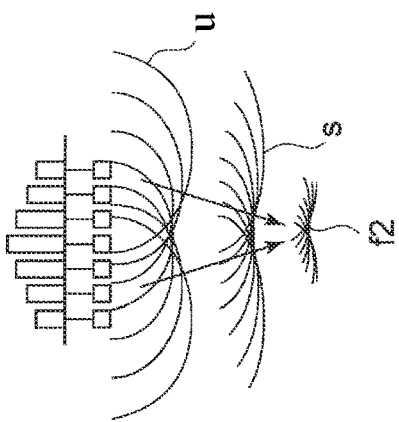
FIGS. 9A to 9D are explanatory diagrams showing various scanning methods using a phased array probe.
Figure 9B:
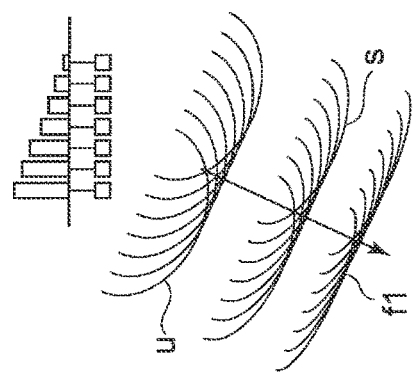
Figure 9C:
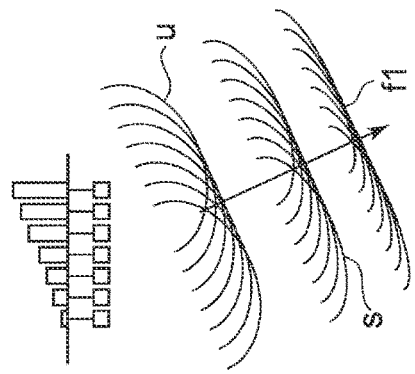
Figure 9D:
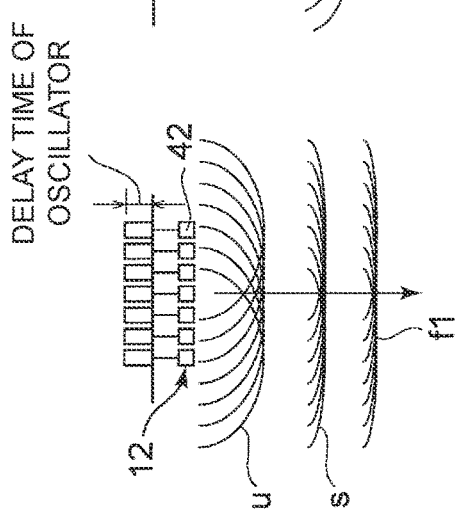

The excitation timing between the oscillators 42 is controlled so that scanning can be performed as depicted in FIGS. 9B and 9C, for instance. The emitting pattern depicted in FIG. 9B is employed in the first transmission step, and the emitting pattern depicted in FIG. 9C is employed in the second transmission step, for instance.

Accordingly, it is possible to change the radiation direction of ultrasonic waves emitted from the oscillators 42 not only to the direction defined by the skew angle A but also to the circumferential direction "b" of the rotor disc 106. Thus, it is possible to expand the scanning range "t" of ultrasonic waves to a wide range in a fan shape. The emitting pattern is not limited to the first emitting pattern and the second emitting pattern. For instance, a plurality of emitting patterns may be employed to scan the radiation direction of ultrasonic waves electrically and continuously, which makes it possible to analyze the scanning range "t" in detail.

According to the present embodiment, the plurality of oscillators 42 are arranged along the circumferential direction "b" of the rotor-disc end surface 106a, and ultrasonic waves are emitted in the first emitting pattern and the second emitting pattern, whereby it is possible to easily change the radiation direction of ultrasonic waves in the circumferential direction "b" of the rotor-disc end surface 106a without changing the direction of the phased array probe 12.

Changing the radiation direction of ultrasonic waves in the circumferential direction "b" of the rotor-disc end surface 106a makes it possible to detect defects such as cracks in the second emitting pattern, even if the defects cannot be detected in the first emitting pattern, and vice versa.

Accordingly, even if the blade groove portion 108 is of a curved side entry type in which defects are formed in more various and complicated directions than in a side entry type, it is possible to detect defects in a wide range and at high accuracy.

Furthermore, the first transmission step and the second transmission step are performed before and after the radial-direction moving step, and thereby it is possible to detect defects easily at high accuracy over a wide range without changing the direction of the phased array probe 12.

Furthermore, since the oscillators 42 have both functions of emitting and receiving ultrasonic waves, it is possible to detect defects easily at high accuracy with a simple configuration.

The ultrasonic flaw-detection apparatus 10 includes the rotor-disc support deice 39, and thereby it is possible to move the phased array probe 12 easily along the radial direction of the rotor disc 106. Thus, it is possible to detect defects accurately and easily over a wide range for one blade groove portion 108.

Furthermore, it is possible to easily place the phased array probe 12 on a position on the rotor-disc end surface 106a by rotating the rotor disc 106, moving the trolley 34, extending and contracting the support pole 38, extending and contracting the arm 31, and rotating the arm 31. Thus, it is possible to detect defects accurately and easily over a wide range for more than one blade groove portion 108.

Furthermore, since it is possible to bring the phased array probe 12 into close contact with the rotor-disc end surface 106a with elastic forces of the springs 18, it is possible to improve the accuracy in detecting defects even further.

Figure 4:
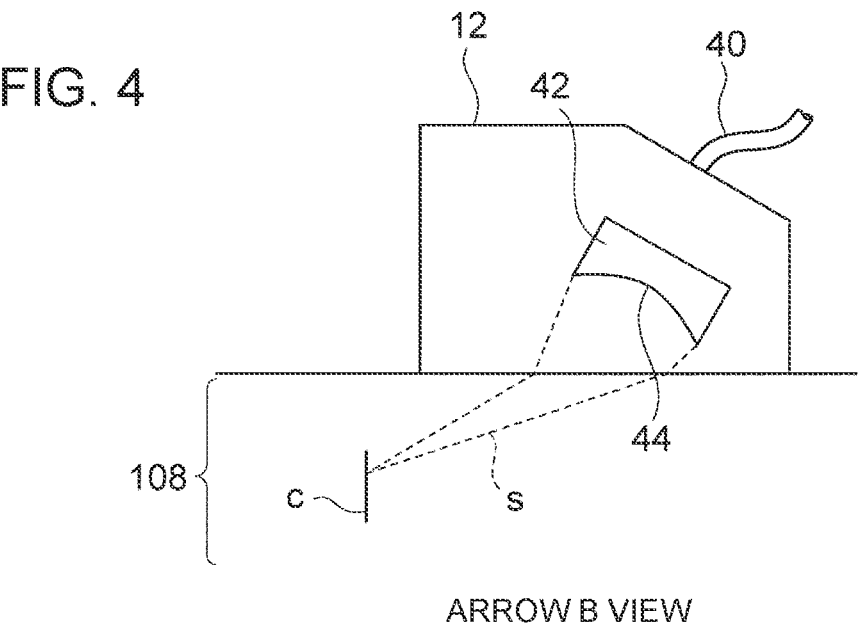
FIG. 4 is a schematic diagram according to yet another embodiment of the present invention, as seen in the direction of arrow B in FIG. 3.

FIG. 4 is a schematic diagram of an oscillator 42 according to yet another embodiment of the present invention, as seen in the direction of arrow B in FIG. 3. In some embodiments, each of the oscillators 42 has an ultrasonic-wave emitting surface 44 having a concave shape extending longer in a direction that intersects with an arrangement direction of the oscillators 42 than in the arrangement direction, and being recessed at center from the blade groove portion 108 in a direction that intersects with the arrangement direction so that ultrasonic waves emitted from the ultrasonic-wave emitting surface 44 converge at one focal point.

With this configuration, the composite wave front "s" of the ultrasonic waves "u" emitted from the ultrasonic-wave emitting surfaces 44 of the respective oscillators 42 converges at one focal point, which makes it possible to increase the accuracy in detecting defects in the vicinity of the focal point.

In some embodiments, in the phased array probe 12, each of the oscillators 42 is disposed in a state in which the longitudinal direction of the oscillator 42 is inclined from the rotor-disc end surface 106a so that the incident angle of ultrasonic waves is oblique with respect to the rotor-disc end surface 106a.

Figure 5:
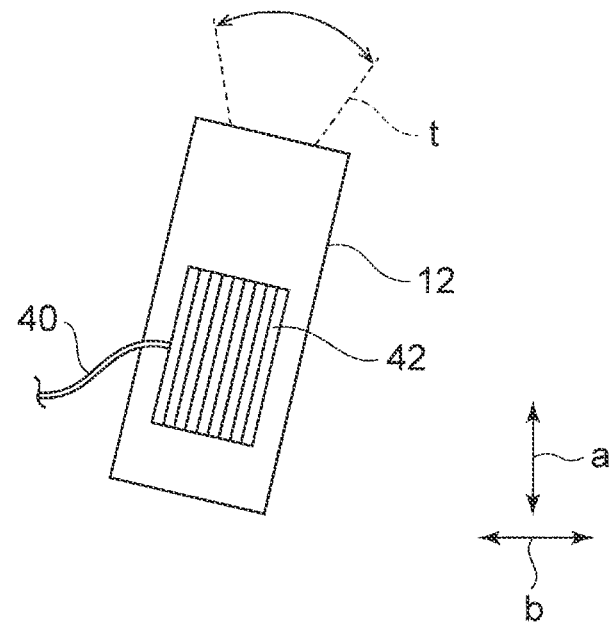
FIG. 5 is a schematic diagram of a phased array probe according to yet another embodiment of the present invention.

FIG. 5 is a schematic view of a phased array probe 12 according to another embodiment of the present invention applied to a small turbine rotor. In the present embodiment, the rotor disc 106 and the blade groove portion 108 are reduced in size, and thus the phased array probe 12 is also reduced in size, so that the number of the oscillators 42 is about half of that in the above embodiment. For instance, if the number of oscillators 42 in the present embodiment is 32, the number of the oscillators 42 is 16 in the present embodiment.

Accordingly, the phased array probe 12 can be reduced in size by adjusting the number of the oscillators 42 in accordance with the size and shape of the rotor disc 106 and the blade groove portion 108. Thus, even if a turbine rotor has small gaps between rotor discs and between blade groove portions, it is possible to check the turbine rotor easily at high accuracy.

Figure 6:
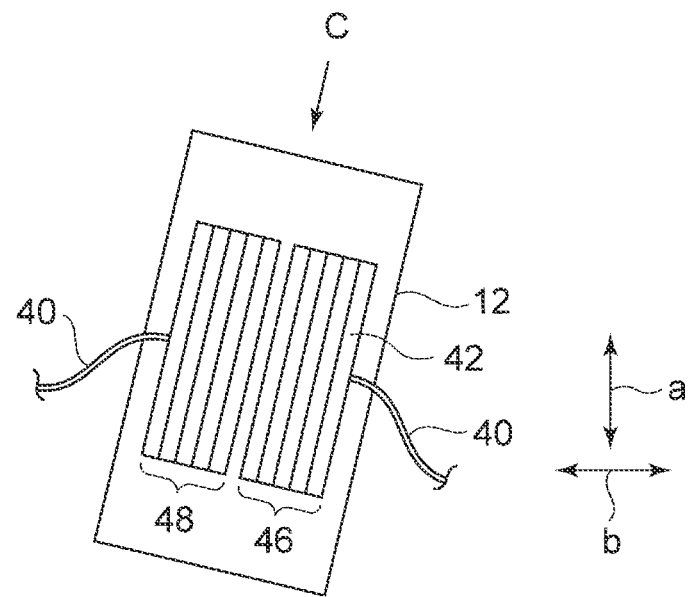
FIG. 6 is a schematic diagram of a phased array probe according to yet another embodiment of the present invention.
Figure 7:
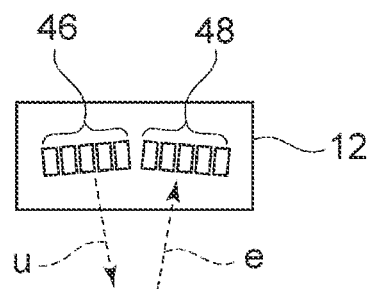
FIG. 7 is a view in a direction of arrow C in FIG. 6.

Next, yet another embodiment of the present invention will be described with reference to FIGS. 6 and 8. As depicted in FIGS. 6 and 7, in the present embodiment, a ultrasonic-wave emitting part 46 and a ultrasonic-wave receiving part 48 are separately provided, each comprising the oscillator 42. The ultrasonic-wave emitting part 46 and the ultrasonic-wave receiving part 48 are disposed on different positions inside the phased array probe 12. The emitting surface of the ultrasonic-wave emitting part 46 and the receiving surface of the ultrasonic-wave receiving part 48 are inclined in such directions that the surfaces face each other.

The ultrasonic-wave emitting part 46 emits ultrasonic waves "u" to the blade groove portion 108, and the ultrasonic-wave receiving part 48 receives reflection waves "e" reflected from the blade groove portion 108, to analyze waveforms of the like of the reflection waves "e" and detect presence and size of defects. The configuration is otherwise the same as that of the above embodiment.

Figure 8:
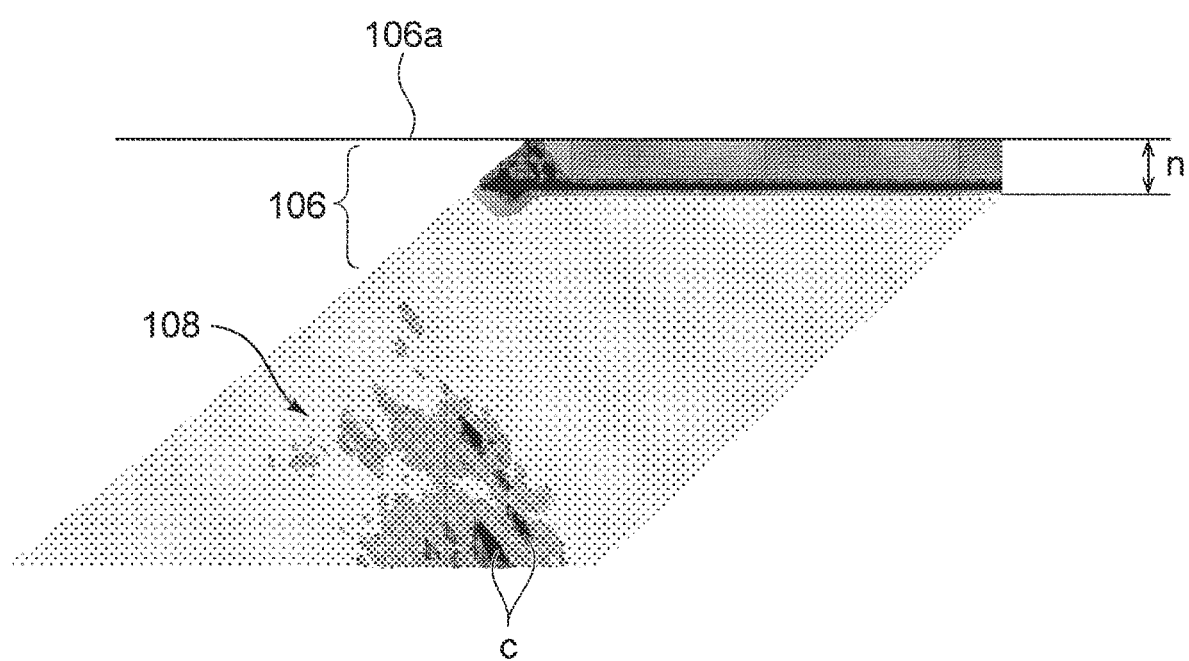
FIG. 8 is a schematic diagram showing formation of a dead zone in a case where a ultrasonic-wave emitting part and a ultrasonic-receiving part are separated.

As depicted in FIG. 8, if the ultrasonic-wave emitting part 46 and the ultrasonic-wave receiving part 48 are constituted by the same oscillator, incident waves and reflection waves interfere with each other and a dead zone "n" is formed to face the surface of the rotor-disc end surface 106a.

In the present embodiment, since the ultrasonic-wave emitting part 46 and the ultrasonic-wave receiving part 48 are separately provided, it is possible to suppress interference between ultrasonic waves emitted by the oscillator 42 (incident waves) and reflection waves, in the vicinity of the rotor-disc end surface 106a. As a result, it is possible to reduce the dead zone "n" that develops on the surface of the rotor-disc end surface 106a, and thereby it is possible to detect defects easily at high accuracy even in a region closer to the surface of the rotor-disc end surface 106a.

In some embodiments, the ultrasonic-wave emitting part 46 and the ultrasonic-wave receiving part 48 are arranged in the width direction of the phased array probe 12, and the plurality of oscillators of the ultrasonic-wave emitting part 46 and the ultrasonic-wave receiving part 48 are also arranged in the width direction of the phased array probe 12. The emitting surfaces of the plurality of oscillators of the ultrasonic-wave emitting parts 46 and the receiving surfaces of the oscillators of the ultrasonic-wave receiving part 48 are inclined from the end surface of the rotor disc, specifically, inclined so that normals of the emitting surfaces and normals of the oscillators intersect with each other at the side of the rotor disc.

Embodiments of the present invention were described in detail above, but the present invention is not limited thereto, and various amendments and modifications may be implemented.

INDUSTRIAL APPLICABILITY

According to at least one embodiment of the present invention, it is possible to easily and accurately detect defects such as cracks in a blade groove portion for fixing a turbine blade disposed on a rotor disc of a turbine.

DESCRIPTION OF REFERENCE NUMERALS

10 Ultrasonic flaw-detection apparatus
12, 100 Phased array probe

14 Frame
14a Rotational shaft
16 Support frame
18 Spring
20 Support frame
20a Support frame body
20b Main shaft
22 Bolt
24 Ball
26 Probe support device
28 Height adjustment part
30 Shaft
31 Arm
32 Scanning-position adjustment part
34 Trolley
36 Caster
38 Support pole
40 Cable
42, 110 Oscillator
44 Ultrasonic-wave emitting surface
46 Ultrasonic-wave emitting part
48 Ultrasonic-wave receiving part
102 Turbine blade
104 Blade root portion
106 Rotor disc
106a End surface
106b Outer peripheral surface
108 Blade groove portion
A Skew angle
c Crack
e Reflection wave
n Dead zone
s Composite wave front
t Scanning range
u Ultrasonic wave

The invention claimed is:

1. A method of performing ultrasonic flaw-detection for a blade groove portion of a turbine rotor disc for checking a blade groove portion by a phased array method, the blade groove portion being disposed on a rotor disc of a turbine for fixing a turbine blade, the method of performing ultrasonic flaw-detection comprising:

a providing step of providing the rotor disc of a side entry type having the blade groove portion which is curved and deviated from an axial direction of the rotor disc;

an arrangement step of arranging a phased array probe including a plurality of oscillators each of which is capable of emitting ultrasonic waves on an end surface of the rotor disc, in a parallel state in which the plurality of oscillators are arranged along a circumferential direction of the rotor disc;

a first transmission step of emitting ultrasonic waves from the plurality of oscillators in the parallel state, while a timing of emitting the ultrasonic waves from each of the oscillators is controlled in a first emission pattern, and receiving reflection waves of the ultrasonic waves; and a second transmission step of emitting ultrasonic waves from the plurality of oscillators in the parallel state, while the timing of emitting the ultrasonic waves from each of the oscillators is controlled in a second emission pattern different from the first emission pattern, and receiving reflection waves of the ultrasonic waves, and further comprising:

a first radial-direction moving step of moving the probe along a radial direction of the rotor disc, the radial direction being perpendicular to a circumferential direction of the rotor disc, a first detection step of performing the first transmission step and the second transmission step after the first radial-direction moving step, a circumferential-direction moving step of rotating the rotor disc with respect to the probe after the first detection step, a second radial-direction moving step of moving the probe along the radial direction of the rotor disc, and a second detection step of performing the first transmission step and the second transmission step after the second radial-direction moving step, wherein the blade groove portion of the side entry type is configured as a blade groove portion of a curved side entry type which extends in an arc shape so as to deviate from the axial direction of the rotor disc.

2. The method of performing ultrasonic flaw-detection for a blade groove portion of a turbine rotor disc according to claim 1, wherein each of the plurality of oscillators has an emitting surface capable of emitting the ultrasonic waves, and wherein the emitting surface has a concave shape extending longer in a direction that intersects with an arrangement direction of the oscillators than in the arrangement direction, and being recessed at center in a direction that intersects with the arrangement direction so that the ultrasonic waves emitted from the emitting surface converge at one focal point.

3. The method of performing ultrasonic flaw-detection for a blade groove portion of a turbine rotor disc according to claim 1, further comprising:

an adjustment step of adjusting a number of the plurality of oscillators included in the phased array probe in accordance with a size or a shape of the blade groove portion.

4. The method of performing ultrasonic flaw-detection for a blade groove portion of a turbine rotor disc according to claim 1, wherein each of the plurality of oscillators is capable of receiving the reflection waves of the ultrasonic waves.

5. The method of performing ultrasonic flaw-detection for a blade groove portion of a turbine rotor disc according to claim 1, further comprising:

a plurality of receiving oscillators for receiving the reflection waves of the ultrasonic waves.

* * * * *